(12) United States Patent
Nguyen et al.

(10) Patent No.: US 12,486,188 B1
(45) Date of Patent: Dec. 2, 2025

(54) VERSATILE PHYSICOCHEMICAL WATER TREATMENT SYSTEM AND METHOD

(71) Applicant: Cuong Ngoc Nguyen, Ho Chi Minh (VN)

(72) Inventors: Cuong Ngoc Nguyen, Ho Chi Minh (VN); Hoang Xuan Nguyen, Ha Noi (VN)

(73) Assignee: INTERNATIONAL MEDICAL CONSULTANTS COMPANY LIMITED, Ha Noi (VN)

( * ) Notice: Subject to any disclaimer, the term of this patent is extended or adjusted under 35 U.S.C. 154(b) by 0 days.

(21) Appl. No.: 19/228,732

(22) Filed: Jun. 4, 2025

(51) Int. Cl.
*C02F 9/00* (2023.01)
*B01F 25/4314* (2022.01)
(Continued)

(52) U.S. Cl.
CPC ............ *C02F 9/00* (2013.01); *B01F 25/4314* (2022.01); *C02F 1/008* (2013.01); *B01F 2101/305* (2022.01); *B01F 2215/0431* (2013.01); *C02F 1/36* (2013.01); *C02F 1/46109* (2013.01); *C02F 1/482* (2013.01); *C02F 1/722* (2013.01); *C02F 1/78* (2013.01); *C02F 2101/203* (2013.01); *C02F 2101/206* (2013.01); *C02F 2101/301* (2013.01); *C02F 2101/306* (2013.01); *C02F 2101/308* (2013.01); *C02F 2201/007* (2013.01); *C02F 2201/4613* (2013.01); *C02F 2201/4617* (2013.01); *C02F 2201/483* (2013.01); *C02F 2209/005* (2013.01); *C02F 2301/024* (2013.01); *C02F 2303/04* (2013.01); *C02F 2305/026* (2013.01)

(58) Field of Classification Search
CPC .... C02F 9/00; C02F 1/008; C02F 1/36; C02F 1/46109; C02F 1/482; C02F 1/722; C02F 1/78; C02F 2101/203; C02F 2101/206; C02F 2101/301; C02F 2101/306; C02F 2101/308; C02F 2201/007; C02F 2201/4613; C02F 2201/4617; C02F 2201/483; C02F 2209/005; C02F 2301/024; C02F 2303/04; C02F 2305/026; B01F 25/4314; B01F 2101/305; B01F 2215/0431
See application file for complete search history.

(56) References Cited

U.S. PATENT DOCUMENTS 12,227,439 B2 * 2/2025 Yost ...................... C02F 1/4672
2014/0048466 A1 * 2/2014 McGuire ................... C02F 1/36
210/170.09

* cited by examiner

*Primary Examiner* — Terry K Cecil (57) ABSTRACT

A modular versatile physicochemical water treatment system and method are provided for treating various water types. The system features an acceleration chamber module combining a static mixer for hydrodynamic cavitation, an ultrasonic transducer assembly (25-40 kHz) for acoustic cavitation, permanent magnets for a static magnetic field, and a magnetic field generating coil for variable multipole magnetic fields, including square and/or triangular waveforms, controlled by a central control unit. Optional modules include a chemical dosing module ($Fe^{3+}/H_2O_2$ or $O_3/H_2O_2$) and an electrolysis module with automatic polarity reversal. The method involves selectively and coordinately applying these effects, tailored to the water type, to achieve optimal treatment efficiency.

15 Claims, 6 Drawing Sheets

(51) Int. Cl.
*B01F 101/00* (2022.01)
*C02F 1/00* (2023.01)
*C02F 1/36* (2023.01)
*C02F 1/461* (2023.01)
*C02F 1/48* (2023.01)
*C02F 1/72* (2023.01)
*C02F 1/78* (2023.01)
*C02F 101/20* (2006.01)
*C02F 101/30* (2006.01)

VERSATILE PHYSICOCHEMICAL WATER TREATMENT SYSTEM AND METHOD

FIELD OF THE INVENTION

This invention pertains to water treatment, specifically a system and method integrating acoustic cavitation, the application of magnetic fields controlled according to specific wave modes, hydrodynamic cavitation, chemical oxidation, and optional electrolysis to treat domestic water, wastewater, agricultural water, or aquaculture water.

BACKGROUND ART

Water treatment is a critical process for addressing pollution and ensuring water quality for various applications, such as domestic use, industrial wastewater management, and agricultural or aquacultural purposes. Traditional water treatment systems often rely on singular methods, such as chemical disinfection, filtration, or biological treatment, which may lack flexibility or effectiveness when applied to complex water sources containing organic pollutants, microorganisms, or hardness-causing ions.

In the modern field of water treatment, various technologies have been developed to enhance the removal efficiency of organic and inorganic pollutants, microorganisms, and other harmful components. Common methods include the use of hydrodynamic cavitation, ultrasonic cavitation, magnetic field treatment, water electrolysis, and advanced oxidation processes (AOPs) such as Fenton reactions or ozonation. However, existing technologies often focus on one or a few individual stages, lacking overall integration, flexible adaptability to different water types, and optimization of the synergy between physical and chemical methods.

Several prior art documents illustrate previous efforts but still exhibit limitations compared to the solution proposed in the present invention. For example:

U.S. Pat. No. 8,999,154 B2 describes a water treatment apparatus using cavitation and electrolysis to remove pollutants from lake water. The apparatus disclosed in U.S. Pat. No. 8,999,154B2 applies hydrodynamic cavitation combined with electrolysis in a fixed structure, lacking modular flexibility and not integrating magnetic field effects or flexible chemical dosing like $Fe^{3+}/H_2O_2$. The present invention allows customization for different water types, features modularity, and integrates multiple treatment technologies (acoustic cavitation, multipole magnetic fields, chemicals, electrolysis), enhancing treatment efficiency.

International Publication No. WO 2006/045108 A2 discloses an apparatus and process for water treatment using hydrodynamic cavitation to destroy organic impurities. However, WO2006/045108A2 does not integrate electrolysis, does not coordinate chemical processes like the Fenton reaction, and lacks a system for managing supporting multipole magnetic fields. The present invention not only utilizes hydrodynamic cavitation but also combines acoustic cavitation, magnetic fields, electrolysis, and chemicals within a modular, highly customizable system.

Chinese Patent Application No. CN 103896387 A mentions an apparatus combining hydrodynamic cavitation and magnetic fields to enhance reactions in water. This document does not integrate electrolysis, lacks electrode polarity reversal capability, and does not coordinate with chemical oxidation processes like $Fe^{3+}/H_2O_2$. The present invention utilizes both static and multipole magnetic fields, simultaneously combined with acoustic cavitation and chemical processes (electro-Fenton), notably featuring an automatic polarity reversal mechanism in the electrolysis unit to extend electrode lifespan.

International Publication No. WO 2015/005921 A1 relates to a hydrogen generation apparatus using multiple influencing factors such as cavitation and electrochemistry. The primary goal of the invention in WO2015005921A1 is hydrogen production, not diverse water treatment, and it does not target the treatment of polluted domestic, agricultural, or aquaculture water. The present invention is directly aimed at water treatment, with the flexibility to handle various water types suitable for practical domestic and industrial environments.

U.S. Pat. No. 8,673,129 B2 discloses a high-capacity water treatment apparatus using cavitation and electrocoagulation. The device in U.S. Pat. No. 8,673,129B2 has a fixed structure, targets large-scale industrial applications, lacks modular flexibility for different smaller-scale water types, and does not integrate multipole magnetic field treatment or a flexible chemical selection mechanism. The present invention is suitable for small to medium industrial scales, is easily installable, and adjustable according to the level of contamination in domestic water, domestic wastewater, irrigation water, or aquaculture water.

From the cited prior art, it can be seen that previously disclosed devices often focus on one or a few individual technologies; most lack modularity and the ability to flexibly coordinate multiple technologies; they do not mention or have not optimized a periodic electrode polarity reversal mechanism, a crucial factor for enhancing efficiency and lifespan of electrolysis equipment.

Therefore, there is a need for a physicochemical water treatment system and method that exhibits high modularity, allowing individual modules to operate independently or in coordination, depending on the water type and pollution level.

There is also a need for a physicochemical water treatment system and method that synergistically integrates multiple treatment principles, including hydrodynamic cavitation, acoustic cavitation, multipole magnetic fields, efficient chemical mixing, and electrolysis with automatic polarity reversal.

Furthermore, there is a need for a physicochemical water treatment system and method that offers flexible treatment capabilities, applicable to common domestic water, agricultural water, wastewater, and aquaculture water through different physicochemical module configurations.

Finally, there is a need for a physicochemical water treatment system and method with centralized control capabilities via a central controller. The central controller should have an integrated structure to optimize the treatment process, monitor, and adjust according to the treatment cycle suitable for each water type.

The present invention provides solutions to achieve these objectives.

SUMMARY OF THE INVENTION

The purpose of the present invention is to propose a versatile physicochemical water treatment system capable of flexibly treating various types of water with high efficiency, through a physicochemical modular combination of physical and chemical treatment technologies including hydrodynamic cavitation, acoustic cavitation, multipole magnetic fields capable of generating specific waveforms, effective chemical mixing, and electrolysis with an automatic polarity reversal mechanism.

The versatile physicochemical water treatment system comprises several main components.

A key component is the acceleration chamber module, which serves as the primary treatment unit for domestic water or initial influent. This module operates based on a combination of physical mechanisms. It includes a static mixer with a special structure, designed to create a swirling turbulent flow and hydrodynamic cavitation, aiding in stirring and increasing contact between water and treatment agents. It also incorporates an ultrasonic transducer assembly emitting ultrasonic waves in the frequency range of 25-40 KHz; these ultrasonic waves create acoustic cavitation, characterized by the formation, growth, and collapse of microbubbles, which helps break down contaminant bonds, disinfect bacteria, and enhance chemical reactions in the water. Furthermore, the module contains a magnetic field generation assembly. This assembly comprises permanent magnets that create a static magnetic field, supporting ion coagulation processes and altering the crystal structure of mineral salts to limit scale formation. It also includes a magnetic field generating coil, controlled by the central control unit, which is capable of generating a variable multipole magnetic field. Particularly, this coil can generate magnetic fields in the form of square waves and triangular waves. These variable magnetic fields strongly affect dissolved ions, enhance the efficiency of cavitation processes, support ion separation, prevent scaling, and promote physicochemical reactions. Consequently, water passing through the acceleration chamber module is primarily treated by the combined effects of hydrodynamics from the static mixer, acoustic cavitation from the ultrasonic transducer assembly, and various magnetic fields, including the static magnetic field from permanent magnets and the variable magnetic fields in square or triangular wave forms from the magnetic field generating coil.

Another component is the chemical dosing module, designed to be connected upstream of the acceleration chamber module inlet when treating wastewater or water with high organic pollution. This module includes a chemical storage unit, for example, containing $Fe^{3+}/H_2O_2$ for Fenton reaction, or $O_3/H_2O_2$ for peroxone reaction, along with a water pump and a gas-liquid mixing unit (injector) to effectively mix the chemical solution into the water stream.

The system may also include an electrolysis module, which is installed in series after the acceleration chamber module when treating highly polluted wastewater. This module consists of an electrolysis chamber, an electrode plate assembly (anode and cathode), and a direct current (DC) power supply. An important feature of this module is an automatic polarity reversal circuit, controlled by the central control unit, that periodically changes the anode-cathode polarity. This periodic reversal serves to prevent scaling and extend electrode lifespan. When operating in conjunction with the chemical dosing module, electrochemical Fenton reactions can occur, further enhancing the degradation of pollutants.

Finally, the central control unit supplies power and coordinates the entire operation of the system. It is designed to enable flexible and stable system operation, ensuring safety and long-term operational efficiency, especially with its capability for precise control of the generated magnetic field forms. The functions of the central control unit include providing power from 220V AC or a stable DC source, and enabling semi-automatic operation via a control panel equipped with push buttons and status indicator lights. It also independently controls the on/off state of each device, such as the water pump in the chemical dosing module, the water pump supplying the electrolysis module, and the ultrasonic transducer assembly. Furthermore, the central control unit expertly controls the magnetic field generating coil; through an integrated Pulse Signal Generator and Pulse Width Modulation (PWM) circuits (housed within the Control-Reversal Block and device control circuit, respectively), it can direct the coil to generate a multipole magnetic field, including emitting magnetic fields in square and triangular wave forms with adjustable frequency and intensity, thereby allowing optimization of the magnetic field's impact on the water for different treatment purposes. Lastly, it coordinates the polarity reversal circuit for the electrolysis module, periodically performing the anode-cathode pole switching.

Another object of the present invention is to provide a versatile physicochemical water treatment method with high modularity, allowing each module to operate independently or in coordination, depending on the water type and pollution level. The versatile physicochemical water treatment method is performed by first supplying influent water to the acceleration chamber module, which includes pumping water into it using a water pump. Second, the type of water to be treated is determined, whereby if it is domestic water, only the acceleration chamber module is operated; if it is wastewater or organically polluted water, the chemical dosing module is activated; and if it is highly polluted wastewater, the electrolysis module is additionally activated. Third, during operation, the process involves generating hydrodynamic cavitation, acoustic cavitation, and magnetic field effects, wherein the generated magnetic field includes a static magnetic field from permanent magnets and a multipole magnetic field from the magnetic field generating coil, which in turn includes emitting magnetic fields in square and triangular wave forms with adjustable frequency and intensity; concurrently, chemical treatment ($Fe^{3+}/H_2O_2$ or $O_3/H_2O_2$) is coordinated if applicable, and electrolysis is performed to enhance the removal of organic substances, microorganisms, color, and odor. Finally, periodic electrode polarity reversal is automatically controlled within a predetermined time interval to maintain electrochemical efficiency.

Another object of the present invention is to propose a versatile physicochemical water treatment system that is easy to construct, maintain, and suitable for industrial, domestic, or agricultural environments.

These and other advantages of the invention will be apparent to those of ordinary skill in the art upon reading the detailed description and viewing the accompanying drawings presented below.

BRIEF DESCRIPTION OF THE DRAWINGS

The accompanying drawings, which are incorporated in and constitute a part of this specification, illustrate embodiments of the invention and, together with the description, serve to explain the principles of the invention, wherein.

The drawings are for illustrative purposes only and depict various embodiments of the invention. A person skilled in the art will readily recognize from the following detailed description that alternative embodiments of the structures and methods illustrated herein may be employed without departing from the principles of the invention described herein.

DETAILED DESCRIPTION OF THE INVENTION

The following detailed description considers preferred embodiments of the invention, examples of which are illustrated in the accompanying drawings. Although the invention will be described in conjunction with its preferred embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be apparent to one of ordinary skill in the art that the present invention may be practiced without these specific details. It is to be further understood that the present invention is not limited to the particular methodology, compounds, materials, manufacturing techniques, uses, and applications described herein, as these may vary. It is also to be understood that the terminology used herein, such as mechanical connection/linking, electrical connection/linking, etc., is for the purpose of describing particular embodiments only and is not intended to be limiting of the scope of the present invention. Specifically, "mechanical connection" is understood as the physical linking between parts to transmit force or position, typically performed via standard methods such as bolting, welding, gluing, or coupling; "electrical connection" is the linking to transmit electrical current between components, typically using conductors or standard connectors. These are basic concepts, within the common knowledge of one skilled in the fields of mechanical and electrical engineering, and thus do not require detailed description in the present invention unless the context clearly indicates otherwise.

The present invention will now be described in detail with reference to its embodiments as illustrated in the accompanying drawings.

Figure 1:
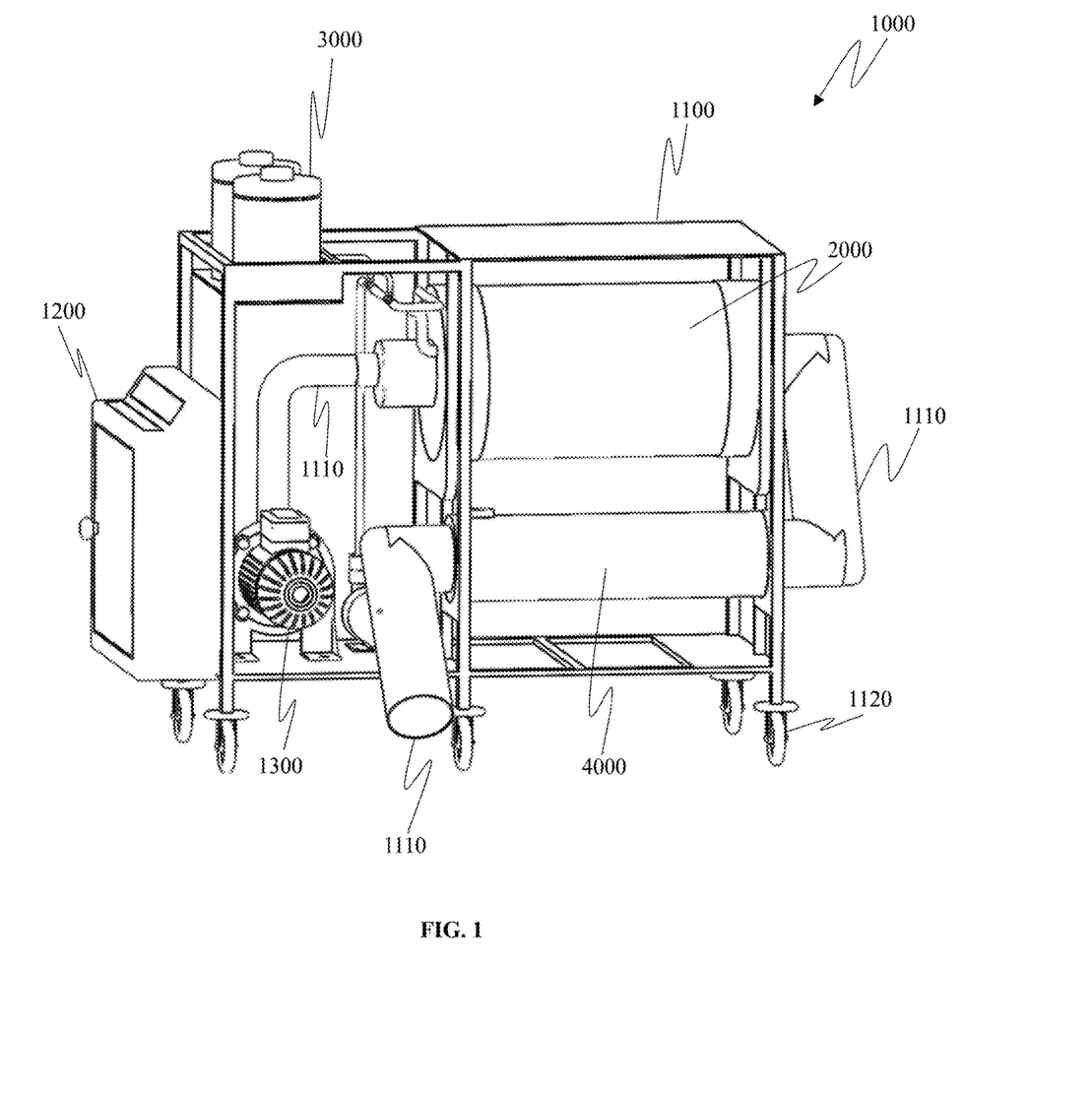
FIG. 1 is a three-dimensional (3D) view illustrating the overall structure of the versatile physicochemical water treatment system according to an embodiment of the invention.

Reference is now made to FIG. 1, which is a three-dimensional (3D) view illustrating the overall structure of the versatile physicochemical water treatment system according to an embodiment of the invention. Accordingly, the versatile physicochemical water treatment system ("system 1000") comprises an acceleration chamber module 2000, a chemical dosing module 3000, an electrolysis module 4000, a machine frame 1100, a central control unit 1200, and water pipes/fittings 1110. The system 1000 also includes a first water pump 1300 used to pump influent water to be treated into the acceleration chamber module 2000. The water pipes/fittings 1110 are used for mechanical connection between the acceleration chamber module 2000 and the first water pump 1300, between the acceleration chamber module 2000 and the electrolysis module 4000, and to conveniently and safely discharge treated water from the system 1000.

According to an embodiment of the invention, the machine frame 1100 is made of stainless steel, aluminum alloy, or any material with equivalent strength and corrosion resistance, having a rectangular shape with horizontal and vertical bars mechanically connected (by bolts and nuts). The machine frame 1100 has supports to fix the acceleration chamber module 2000, the chemical dosing module 3000, and the electrolysis module 4000, along with the first water pump 1300 and the central control unit 1200. The machine frame 1100 ensures that the modules are securely fixed, maintains the relative positions between components, and supports the installation, operation, and maintenance of the system 1000. The machine frame 1100 can also be designed with wheels 1120 for easy movement in industrial environments.

The system 1000 is designed based on the principle of modularization, allowing users to customize it according to the type of water to be treated. This customization includes using only the acceleration chamber module 2000 to treat ordinary domestic water; adding the chemical dosing module 3000 to treat agricultural water or lightly organic wastewater; and combining both the chemical dosing module 3000 and the electrolysis module 4000 to treat heavily industrial/domestic wastewater.

All modules, including the acceleration chamber module 2000, the chemical dosing module 3000, and the electrolysis module 4000, are smoothly coordinated by the central control unit 1200, ensuring that the system 1000 operates efficiently, stably, and energy-savingly.

Continuing with FIG. 1, the acceleration chamber module 2000 plays a central role in the system 1000, using advanced physical methods to treat water, especially domestic water, including water softening, disinfection, and removal of organic impurities, thereby providing clean and safe water. The acceleration chamber module 2000 is designed to treat water through hydrodynamic mechanisms combined with acoustic cavitation and magnetic field effects. This module includes a static mixer that creates strong turbulent flow to increase the efficiency of chemical mixing and surface contact of pollutants; an ultrasonic transducer assembly that emits ultrasonic waves in the 25-40 kHz frequency range to create acoustic cavitation effects, disrupt microbial structures, and support oxidation processes; and a magnetic field generation assembly, which includes a permanent magnet assembly and a magnetic field generating coil, that combines a static magnetic field from the permanent magnets and a multipole magnetic field from the magnetic field generating coil to alter ion structures, prevent scaling, and support coagulation processes.

The main function of the acceleration chamber module 2000 is to treat domestic water or to serve as a pre-treatment step in the treatment chain for more complex water types.

Still with FIG. 1, according to an embodiment of the invention, the chemical dosing module 3000 is used for enhanced specialized water treatment; wherein the chemical dosing module 3000 is installed upstream of the acceleration chamber module 2000, adding chemicals to treat more complex water types such as wastewater, irrigation water, or aquaculture water. The chemicals used include $Fe^{3+}/H_2O_2$ (Fenton reaction) to oxidize persistent organic pollutants, and $O_3/H_2O_2$ (peroxone reaction) to enhance treatment efficiency.

The chemical dosing module 3000 ensures that water is more thoroughly treated before entering the acceleration chamber module 2000, particularly suitable for applications requiring high water quality or strict discharge standards. According to embodiments of the invention, the chemical dosing module 3000 can operate independently or in coordination depending on the influent water type.

Continuing with FIG. 1, the electrolysis module 4000 is used to complete the treatment of wastewater, wherein the electrolysis module 4000 is installed in series after the acceleration chamber module 2000 and is activated only when treating highly polluted wastewater. Through the electrolysis process, this module disinfects water, removes heavy metals, and reduces COD (Chemical Oxygen Demand), ensuring water meets discharge standards.

This is the final step in the wastewater treatment chain, adding specialized water treatment capability to the system 1000. Depending on the requirements of the water source to be treated, the electrolysis module 4000 can operate independently or in combination with the chemical dosing module 3000 to increase disinfection and oxidation efficiency.

Still with FIG. 1, according to an embodiment of the invention, the central control unit 1200 is the brain coordinating the entire operation of the system 1000. The central control unit 1200 is designed as a compact electrical cabinet, easy to install and maintain, wherein the system 1000 can be operated in semi-automatic mode, with an external control panel (not shown in the figure) for users to start/stop the system and monitor operational status using push buttons or switches (not shown in the figure). The central control unit 1200 ensures the smooth operation of the entire system by performing two main roles: supplying power to the modules, including the acceleration chamber module 2000, the chemical dosing module 3000, and the electrolysis module 4000; and enabling semi-automatic control via a microcontroller or PLC, which allows programming of treatment sequences suitable for each water type. Thanks to this feature, the system 1000 can operate efficiently without continuous manual intervention, while also being easily customizable for different needs.

Details of the structure and operating principle of the acceleration chamber module 2000 (FIG. 2A-FIG. 2D), the chemical dosing module 3000 (FIG. 3A-FIG. 3C), the electrolysis module 4000 (FIG. 4A-FIG. 4B), and the central control unit 1200 (FIG. 5) are discussed below.

Figure 2A:
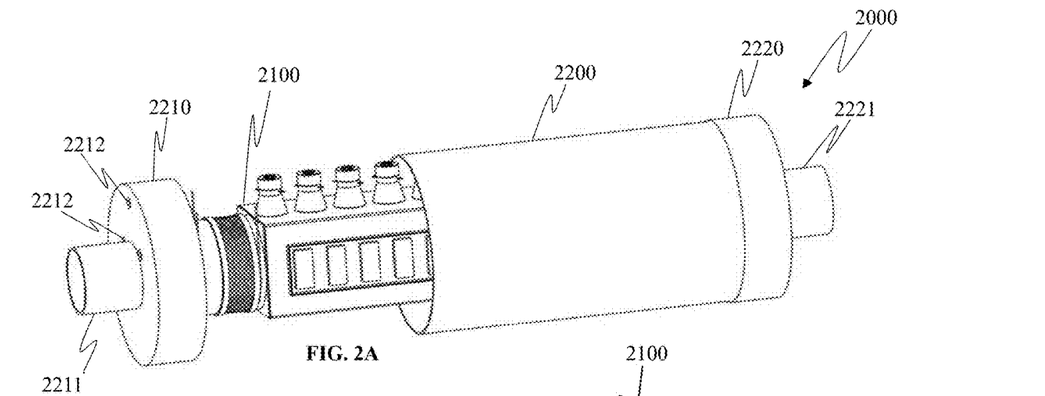
FIG. 2A is a 3D view illustrating the detailed structure of the acceleration chamber module according to an embodiment of the invention.

Reference is now made to FIG. 2A, which is a 3D view illustrating the detailed structure of the acceleration chamber module 2000 according to an exemplary embodiment of the invention. Accordingly, the acceleration chamber module 2000 includes an acceleration assembly 2100 and an outer casing 2200. According to an embodiment of the invention, the outer casing 2200 is made of PVC plastic pipe, enclosing the acceleration assembly 2100 to protect it and facilitate cleaning and maintenance of the acceleration chamber module 2000. The outer casing 2200 has a front end cap 2210 and a rear end cap 2220; wherein the front end cap 2210 has a water inlet 2211 and three open circular holes 2212 used for chemical dosing and electrical connections/linking for the acceleration assembly 2100; the rear end cap 2220 has a water outlet 2221 used to discharge water from the acceleration chamber module 2000.

Figures 2B, 2C:
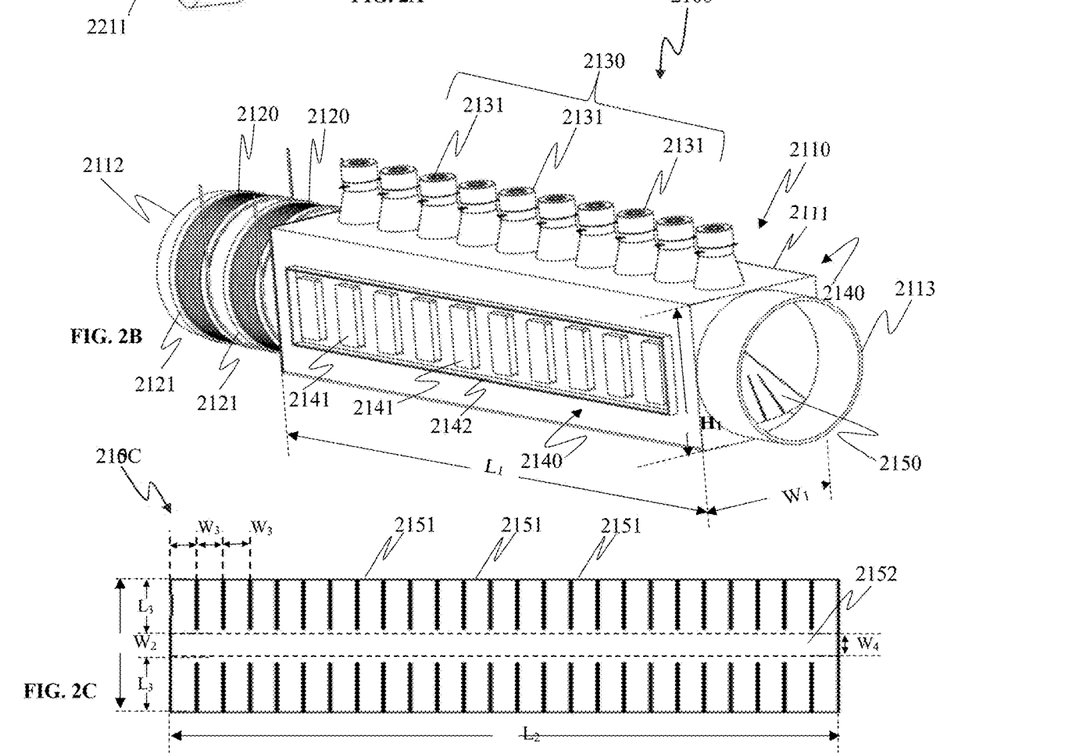
FIG. 2B is a 3D view illustrating the detailed structure of the acceleration assembly of the acceleration chamber module according to an embodiment of the invention.
FIG. 2C is a two-dimensional (2D) view illustrating the static mixer of the acceleration assembly in its uncoiled state according to an embodiment of the invention.

Reference is now made to FIG. 2B, which is a 3D view illustrating the detailed structure of the acceleration assembly 2100 according to an exemplary embodiment of the invention. Accordingly, the acceleration assembly 2100 includes a physicochemical reaction chamber 2110, one or more magnetic field generating coils 2120 (preferably two coil assemblies), an ultrasonic transducer assembly 2130, two permanent magnet assemblies 2140, and a static mixer 2150. According to an embodiment of the invention, the physicochemical reaction chamber 2110 is hollow inside and made of stainless steel, comprising three parts: an inlet section 2112 and an outlet section 2113, which are cylindrical, and a middle body section 2111, which is rectangular box-shaped; wherein the inlet section 2112 is mechanically installed in contact with the front end cap 2210 of the outer casing 2200 and connected to the water inlet 2211 to receive the water source to be treated/cleaned; the outlet section 2113 is mechanically installed in contact with the rear end cap 2220 of the outer casing 2200 and connected to the water outlet 2221 to discharge the treated/cleaned water out of the acceleration chamber module 2000. According to an embodiment of the invention, water is cleaned using the magnetic field generating coil 2120, the ultrasonic transducer assembly 2130, the permanent magnet assemblies 2140, and the static mixer 2150; their structure and operating principles will be discussed below.

Continuing with FIG. 2B, according to an embodiment of the invention, the magnetic field generating coil 2120 is used to create a multipole magnetic field; this type of magnetic field can disrupt the movement of ions in water, thereby preventing crystallization and formation of inorganic scale, while also enhancing the efficiency of redox reactions in water treatment. It should be noted that the term "Multipole Magnetic Field" refers to a magnetic field formed when multiple magnetic poles (North and South poles) are arranged alternately in space, creating a complex turbulent field with amplitude and direction varying with position and time. According to a preferred embodiment of the present invention, the multipole magnetic field is generated by two assemblies of magnetic field generating coils 2120 connected in parallel, wherein each assembly is wound in opposite directions and supplied with oppositely phased control currents to create alternating North-South magnetic poles, thereby forming a time-varying multipole magnetic field region. The parallel connection configuration helps reduce total impedance, distribute current evenly, and increase the ability to control the oscillation frequency of the magnetic field using square or triangular pulses, thereby enhancing water treatment efficiency under different pollution conditions. Specifically, the direction of current flow determines the polarity of the magnetic field generating coils 2120: in one coil, a clockwise current flow creates a North pole, while in the other coil, a counter-clockwise current flow creates a South pole. According to embodiments of the invention, the magnetic field generating coil 2120 is wound with enameled copper wire, with a diameter of 0.5-1.5 mm depending on power, and the number of turns calculated to achieve the target magnetic induction (minimum 0.5 Tesla). The magnetic field generating coil 2120 is wound around the inlet section 2112, with a core made of ferrite, electrical steel, or other magnetic materials with high permeability and low losses at operating frequencies, to concentrate and enhance magnetic flux intensity. Each assembly of the magnetic field generating coil 2120 is secured by a clamp 2121 and supplied with signals from the central control unit 1200. As mentioned above, this magnetic field generating coil 2120 not only creates static or low-frequency variable multipole magnetic fields but also can emit magnetic field pulses in the form of square and triangular waves.

The magnetic field generating coil 2120 operates through square wave generation and triangular wave generation. For square wave generation, the central control unit 1200 supplies a square pulse current to the magnetic field generating coil 2120; the abrupt change in current creates strong magnetic pulses with rapid polarity reversal, which enhances the effect of breaking ion bonds in hard water, is particularly effective for water with high hardness, and enhances the rapid oxidation of complex organic compounds. For triangular wave generation, the central control unit 1200 supplies a triangular waveform current to the magnetic field generating coil 2120; the gradual change in current creates a more uniformly varying magnetic field, which is suitable for treating small organic impurities, soft microorganisms, or low concentrations of heavy metals, helping to achieve uniform ionization, long-term scale reduction, and maintain stable oxygen levels.

The combination of multipole magnetic fields and these waveforms aims to alter ion structures, prevent scaling, support coagulation processes, and enhance physicochemical reactions in water. According to a preferred embodiment of the invention, the magnetic field generating coil 2120 emits waves at a frequency from 5 kHz-100 KHz.

Continuing with FIG. 2B, the ultrasonic transducer assembly 2130 includes ultrasonic transducers 2131 mechanically mounted externally along the middle body section 2111 of the physicochemical reaction chamber 2110 and electrically connected/linked to the central control unit 1200. The ultrasonic transducer assembly 2130 induces acoustic cavitation—the formation, growth, and implosion of microscopic bubbles. This process creates localized regions of extremely high temperature and pressure, shock waves, and free radicals (such as ·OH), which help disrupt the cell structures of microorganisms and decompose organic pollutants. According to embodiments of the present invention, the ultrasonic transducers 2131 operate at a frequency of 25-40 KHz; this frequency is suitable for generating strong cavitation without causing excessive heat. According to embodiments of the present invention, the ultrasonic transducers 2131 are evenly distributed along the middle body section 2111 of the physicochemical reaction chamber 2110 to ensure uniform ultrasonic wave coverage and avoid dead spots.

Still with FIG. 2B, according to an embodiment of the invention, two permanent magnet assemblies 2140 are mechanically installed on two external surfaces adjacent to the surface with the ultrasonic transducer assembly 2130; wherein each permanent magnet assembly 2140 comprises a large number of permanent magnets 2141, these permanent magnets 2141 being arranged with alternating poles (N-S-N-S). The permanent magnet assembly 2140 also includes a rectangular enclosure frame 2142 surrounding the permanent magnets 2141; wherein the enclosure frame 2142 is made of stainless steel and is welded fixedly onto the middle body section 2111 of the physicochemical reaction chamber 2110. It can help direct and concentrate the magnetic field of the permanent magnets 2141, and is particularly designed to minimize magnetic field interference from other parts of the system (such as the magnetic field generating coil 2120 or the ultrasonic transducers 2131). According to a preferred embodiment of the invention, the permanent magnets 2141 are mechanically bonded to the middle body section 2111 using heat-resistant epoxy adhesive (e.g., 3M DP420) or silicone adhesive for stainless steel. The permanent magnet assemblies 2140 generate a variable magnetic field that acts on dissolved ions in the water, changing the physical properties of the water (such as surface tension, solubility), preventing scale formation, and potentially enhancing the efficiency of oxidation processes. According to a preferred embodiment of the invention, each permanent magnet 2141 has a magnetic field strength of 4000 Gauss.

Referring to FIG. 2C, this is a 2D view illustrating the static mixer 2150 in its uncoiled state. Accordingly, the static mixer 2150 is designed for installation inside the middle body section 2111 of the physicochemical reaction chamber 2110, to create a swirling flow and increase the efficiency of water treatment by hydrodynamics. The static mixer 2150 is fabricated from an initially flat stainless steel plate 2150C, which is then processed and formed into a helical shape 2150D as follows:
  a) Initial shape: The flat stainless steel plate 2150C is rectangular with a thickness of 5 mm, a length of $L_2$ mm, and a width of $W_2$ mm; wherein $L_2$ and $W_2$ are positive integers. Along both sides of the length $L_2$, the flat stainless steel plate 2150C is cut into two rows of rectangular static vanes 2151 of uniform size. Each static vane 2151 has a width $W_3=12$ mm and a length $L_3$ equal to 40% of the width $W_2$ of the flat stainless steel plate 2150C. The central part of the flat stainless steel plate 2150C, with a width $W_4$ accounting for 20% of the width $W_2$, is kept intact as the shaft 2152.
  b) Helical shaping, referring to FIG. 2D: After processing, the flat stainless steel plate 2150C is twisted evenly around the shaft 2152 (the central axis of the flat stainless steel plate 2150C) by fixing one end of the plate and rotating the other, ensuring that the twist angle is uniformly distributed over the entire length $L_2$ of the flat stainless steel plate 2150C. As a result, the flat stainless steel plate 2150C deforms into a helical cylindrical structure, which is the static mixer 2150 of the present invention, wherein the shaft 2152 is straight at the center and the static vanes 2151 surround the shaft 2152 in a helical form.

Figure 2D:
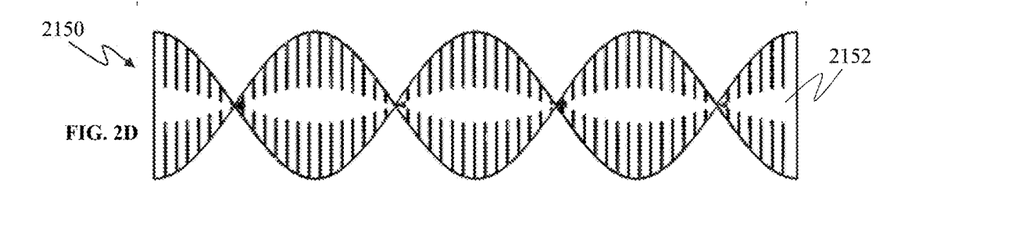
FIG. 2D is a 2D view illustrating the structure of the static mixer according to an embodiment of the invention.

Continuing with FIG. 2C and FIG. 2D, to optimize the mixing efficiency of the static mixer 2150, it needs to meet several criteria: its dimensions must be suitable for the dimensions of the middle body section 2111 of the physicochemical reaction chamber 2110 so as not to obstruct flow but still create effective swirling; the number of twists and static vanes 2151 of the static mixer 2150 must be optimized to enhance hydrodynamic cavitation; and the flow must be maintained stable, without causing excessive pressure or pressure loss.

According to an embodiment of the present invention, depending on the water treatment capacity of the system 1000 at the acceleration chamber module 2000, the dimensions of the static mixer 2150, including length $L_2$ and width $W_2$, will be designed according to the following formula:

$$L_2 = 0.9 \times L_1 \text{ to } 0.95 \times L_1$$

$$W_2 = \pi \times (0.8 \times \min(W_1, H_1) \text{ to } 0.9 \times \min(W_1, H_1))$$

Where, $L_1$ is the length of the middle body section 2111

$W_1$ is the width of the middle body section 2111

$H_1$ is the height of the middle body section 2111

This design of the static mixer 2150 creates turbulent flow, which enhances the thorough mixing of water and chemicals, if any, and creates conditions for hydrodynamic cavitation. This cavitation occurs where localized pressure drops in the flow cause the formation and implosion of bubbles, similar to acoustic cavitation but induced by flow mechanics. Specifically, when the liquid flows through regions of abrupt cross-sectional changes or obstacles, such as the vanes and gaps of the static mixer 2150, the flow velocity increases and the local pressure decreases according to Bernoulli's principle. If the pressure drops below the saturated vapor pressure of the liquid at that temperature, vapor bubbles (cavities) will form. As the flow moves to a region of higher pressure downstream of the obstacle, these vapor bubbles will violently implode. This implosion is similar to acoustic cavitation, generating extremely high localized temperatures (approximately 5000 K) and pressures (approximately 1000 atm), shock waves, and highly reactive free radicals (such as ·OH), contributing to disinfection and pollutant degradation.

With its compact structure and high mixing performance, the static mixer 2150 is easily integrated into the middle body section 2111 of the physicochemical reaction chamber 2110. Water flowing through the static mixer 2150 will be maximally stirred, creating favorable conditions for subsequent treatment stages (ultrasound, chemicals, electrolysis, magnetic field, etc.) to achieve maximum efficiency. Thanks to these features, the static mixer 2150 helps improve the efficiency and stability of the entire treatment system, while ensuring continuous mixing without additional energy consumption or operating costs.

The operating principle of the acceleration chamber module 2000 is as follows: First, at the inlet section 2112, the magnetic field generating coil 2120 creates a multipole magnetic field, orienting ions such as $Ca^{2+}$ and $Mg^{2+}$ to reduce the risk of scaling. Next, water flows into the middle body section 2111 of the physicochemical reaction chamber 2110, where the static mixer 2150, fabricated from a rectangular stainless steel plate cut to form vanes along two edges and twisted evenly around a central axis, forms a helical structure creating forced swirling flow; this swirling flow causes localized low-pressure zones, inducing hydrodynamic cavitation, wherein microscopic bubbles form and implode, generating shock waves and highly oxidizing free radicals (·OH) directly at the surface—extremely effective for destroying impurities and biofilms. Simultaneously, the ultrasonic transducer assembly 2130, emitting ultrasonic waves at 25-40 kHz, creates acoustic cavitation, enhancing disinfection and pollutant degradation. The permanent magnet assembly 2140 creates a stable magnetic field, supporting water softening and suspended particle separation; combining the static magnetic field effect with the swirling flow creates a micro-mixing effect, increasing the dispersion of chemicals and removal of microorganisms. When water impacts the walls of the middle body section 2111 of the physicochemical reaction chamber 2110, the swirling flow combined with ultrasonic waves and magnetic fields induces cavitation near the walls, helping to clean the wall surfaces and prevent scale buildup.

Thus, the system 1000 of the invention achieves several key objectives.

Firstly, it provides comprehensive water cleaning and disinfection. This is accomplished as ultrasonic waves (25-40 kHz) from the ultrasonic transducer assembly 2130 create acoustic cavitation, generating small gas bubbles in the water. When these bubbles implode, they create high local pressure and temperature, which destroys the cell membranes of bacteria, viruses, and algae. The static mixer 2150 further increases the efficiency of ultrasonic wave distribution and thorough water mixing, ensuring the entire water stream is treated. Consequently, domestic water is effectively disinfected, leading to a reduction in bacteria and odor-causing organic substances.

Secondly, the system is adept at altering ion structure and water softening, thereby reducing hardness. The static magnetic field from the permanent magnet assembly 2140, combined with the multipole magnetic field and square/triangular wave magnetic field pulses from the magnetic field generating coil 2120, acts on $Ca^{2+}$ and $Mg^{2+}$ ions in the water. This action changes their crystal structure from a precipitate form to a suspended form; importantly, the triangular wave magnetic field from the magnetic field generating coil 2120 helps maintain the dispersion of these ions, preventing the re-precipitation of scale. As a result, domestic water becomes softer, significantly reducing the risk of scaling within the physicochemical reaction chamber 2110 of the acceleration assembly 2100.

Thirdly, the system effectively reduces organic matter and heavy metals. Acoustic cavitation, in conjunction with the static mixer 2150, oxidizes dissolved organic substances (COD) into $CO_2$ and $H_2O$, and the efficiency of this oxidation reaction can be enhanced by the supply of chemicals such as $H_2O_2$, $Fe^{3+}$, or $O_3$. Furthermore, the magnetic fields from both the permanent magnet assembly 2140 and the magnetic field generating coil 2120 can precipitate heavy metals like Fe and Mn into small particles, which are then easily removable through post-treatment filtration. An overall result of these processes is that domestic water exhibits a higher dissolved oxygen content, leading to improved taste and quality.

In summary, the acceleration chamber module 2000, with its integrated structure of ultrasound, magnetic fields, and static mixer 2150, can effectively treat domestic water, including disinfection, softening, reduction of organic matter/heavy metals, and increasing dissolved oxygen. The impact of square wave magnetic fields (strong pulses, rapid treatment) and triangular wave magnetic fields (uniform dispersion, stable) from the magnetic field generating coil 2120, combined with high-frequency ultrasonic waves from the ultrasonic transducer assembly 2130, makes the system 1000 flexible for different water conditions, enhancing the efficiency and quality of the output water by increasing the ability to limit the formation of inorganic salt scale (such as $CaCO_3$, $Mg(OH)_2$); and increasing the ability to treat hard water before it enters the electrolysis module 4000, reducing the load on the electrodes.

Figure 3A:
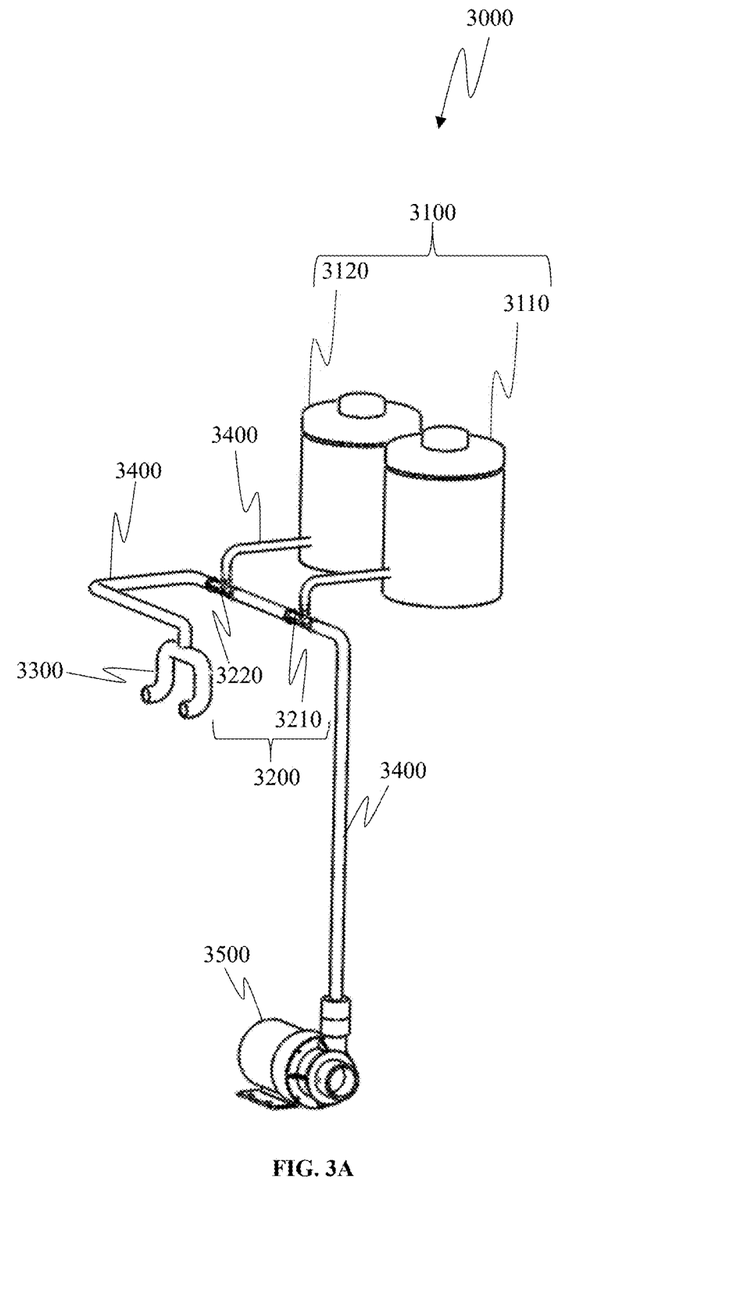
FIG. 3A is a 3D view illustrating the chemical dosing module according to an embodiment of the invention.

Reference is now made to FIG. 3A, which is a 3D view illustrating the detailed structure of the chemical dosing module 3000. Accordingly, the chemical dosing module 3000 includes a chemical storage unit 3100, a gas-liquid mixing unit 3200, a chemical dosing pipe 3300, and a second water pump 3500; all mechanically connected by plastic pipes 3400. According to an embodiment of the invention, the chemical storage unit 3100 is used to store chemical sources, the second water pump 3500 pumps water through the plastic pipes 3400 and the gas-liquid mixing unit 3200, thereby introducing chemicals from the chemical storage unit 3100 into the acceleration chamber module 2000 via the chemical dosing pipe 3300. According to an embodiment of the invention, the chemical sources are strong oxidizing agents, including but not limited to: ferric ions ($Fe^{3+}$), hydrogen peroxide ($H_2O_2$), ozone ($O_3$), or mixtures thereof. According to an embodiment of the invention, the gas-liquid mixing unit 3200 comprises two injectors: a first injector 3210 and a second injector 3220. These two injectors are of the check-valve type, used to draw and mix chemicals (liquid or gas, such as ozone) into the main water stream via the Venturi effect; that is, utilizing pressure differentials to create a strong vortex, which effectively dissolves gas into liquid.

Figure 3B:
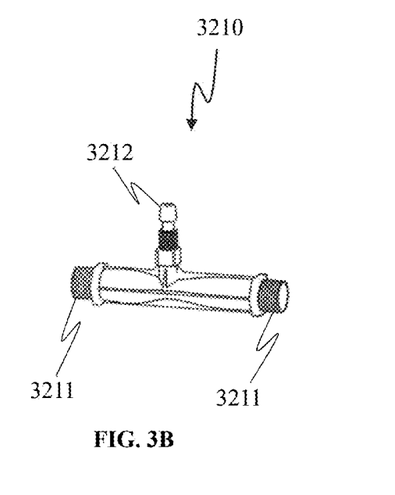
FIG. 3B is a 3D view illustrating the first injector (Venturi injector) of the gas-liquid mixing unit of the chemical dosing module according to an embodiment of the invention.
Figure 3C:
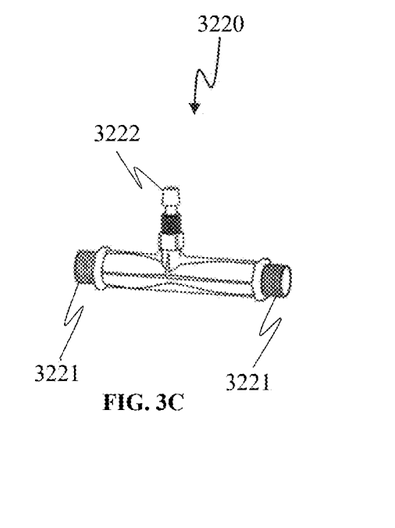
FIG. 3C is a 3D view illustrating the second injector (Venturi injector) of the gas-liquid mixing unit of the chemical dosing module.

Referring to FIG. 3B and FIG. 3C, these two injectors are installed as follows: One liquid connection port 3211 of the first injector 3210 is connected to the second water pump 3500; the other liquid connection port 3211 is connected in series with one liquid connection port 3221 of the second injector 3220; then, the remaining liquid connection port 3221 of the second injector 3220 is connected to the chemical pipe 3300 to thereby deliver the water-chemical mixture into the acceleration assembly 2100 of the acceleration chamber module 2000. According to an embodiment of the invention, the chemical pipe 3300 is a Y-shaped plastic water pipe to optimize the transfer of the water-chemical mixture into the acceleration assembly 2100 of the acceleration chamber module 2000. The gas connection port 3212 of the first injector 3210 and the gas connection port 3222 of the second injector 3220 are both installed facing upwards and are connected to the chemical storage unit 3100. All these connections are mechanical connections using plastic pipes 3400.

In one aspect of the invention, an injector (also known as a chemical nozzle) is a specialized device used to mix gas and liquid in water treatment, chemical, and industrial systems. Therefore, the first injector 3210 and the second injector 3220 will not be described in detail here in this invention, so as not to obscure other important aspects of the present invention.

Returning to FIG. 3A, according to an embodiment of the invention, the chemical storage unit 3100 includes a first chemical tank 3110 and a second chemical tank 3120; wherein the first chemical tank 3110 contains $Fe^{3+}$ and $H_2O_2$ used for wastewater treatment via the Fenton reaction, and the second chemical tank 3120 contains $O_3$ and $H_2O_2$ used for treating water for agriculture and aquaculture via the Peroxone reaction.

The chemical dosing module 3000 supplies the necessary chemicals for water treatment. The chemical dosing module 3000 operates as follows: the second water pump 3500 pumps water through the plastic water pipes 3400 and the gas-liquid mixing unit 3200; depending on the treatment purpose, chemicals from the first chemical tank 3110 ($Fe^{3+}$ and $H_2O_2$) or the second chemical tank 3120 ($O_3$ and $H_2O_2$) will be supplied. The chemicals are thoroughly mixed through the gas-liquid mixing unit 3200 due to the injector structure, then delivered to the acceleration chamber module 2000 via the chemical dosing pipe 3300.

The main chemical reactions are as follows:

Fenton reaction (with $Fe^{3+}$ and $H_2O_2$): $Fe^{3+}$ combines with $H_2O_2$ to generate powerful hydroxyl radicals (OH·) according to the reactions:

Hydroxyl radicals (OH·) are strong oxidants that decompose organic substances in wastewater.

Reaction with $O_3$ and $H_2O_2$: $O_3$ and $H_2O_2$ combine to create the peroxone reaction, producing hydroxyl radicals (OH·) according to the reaction:

OH· radicals and ozone strongly oxidize organic substances, destroying bacteria and viruses in the water, suitable for agricultural and aquaculture water.

According to embodiments of the invention, thanks to the turbulent multipole magnetic field generated by the magnetic field generating coil 2120 of the acceleration chamber module 2000, the Fenton and Peroxone reactions will have higher efficiency; specifically: the generated OH· radicals will be more evenly dispersed due to the swirling flow and modulated magnetic field; the dissociation and redistribution of ions in the water increase catalytic efficiency and reaction rates.

In one aspect of the invention, the injector in the gas-liquid mixing unit 3200 is combined with the second water pump 3500 to adjust the flow rate of chemicals introduced into the water stream, ensuring an appropriate chemical/water ratio for each type of water to be treated (wastewater, agricultural water, or aquaculture water). This helps chemicals mix thoroughly with water from the initial stage, increasing reaction efficiency before the water enters the acceleration chamber module 2000 for further treatment by cavitation and magnetic fields.

As a result, the present invention achieves several objectives: (a) ensuring uniform chemical dispersion so that $Fe^{3+}/H_2O_2$ or $O_3/H_2O_2$ are thoroughly mixed in the water, thereby increasing the efficiency of oxidation reactions; (b) optimizing the treatment of complex water by supporting wastewater treatment via the Fenton reaction or irrigation/aquaculture water treatment via the peroxone reaction through the supply of the correct amount of necessary chemicals; and (c) increasing overall system efficiency because pre-mixing chemicals before water enters the acceleration chamber module 2000 helps the physical processes, such as cavitation and magnetic field effects, within the acceleration chamber module 2000 operate more effectively, ensuring the treated water meets desired quality standards.

Figure 4A:
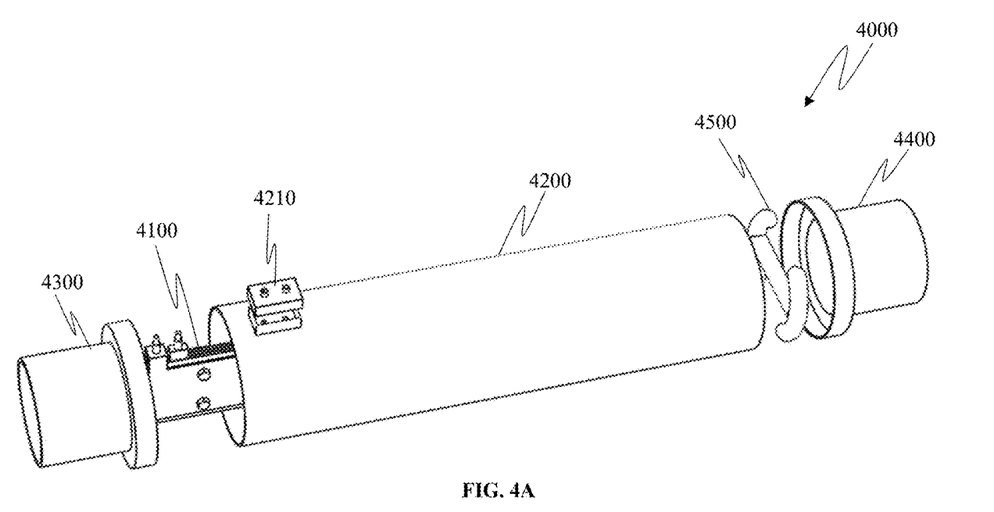
FIG. 4A is a 3D view illustrating the detailed structure of the electrolysis module according to an embodiment of the invention.

Reference is now made to FIG. 4A, which is a 3D view illustrating the detailed structure of the electrolysis module 4000. Accordingly, the electrolysis module 4000 includes an electrode plate assembly 4100, an electrolysis chamber body 4200, a first end cap 4300, a second end cap 4400, and at least one electrode fixing ring 4500; all mechanically connected; wherein the electrolysis chamber body 4200, the first end cap 4300, and the second end cap 4400 enclose and safely protect the electrode plate assembly 4100 and the electrode fixing ring 4500; wherein the electrode plate assembly 4100 is used for water electrolysis inside the electrolysis chamber body 4200. The electrolysis chamber body 4200, the first end cap 4300, and the second end cap 4400 are heat-resistant PVC cylindrical pipes; wherein the first end cap 4300 is the outlet for water after electrolysis, and the second end cap 4400 is the inlet for water supply to the electrolysis module 4000. According to an embodiment of the invention, the second end cap 4400 receives influent water from the rear end cap 2220 of the acceleration chamber module 2000 via pipes/fittings 1110 as shown in FIG. 1. According to an embodiment of the invention, the electrolysis chamber body 4200 also includes a power connection box 4210 which, in addition to fixing the electrode plate assembly 4100, is also used to ensure safety from the electrical connection between the electrode plate assembly 4100 and the central control unit 1200.

Figure 4B:
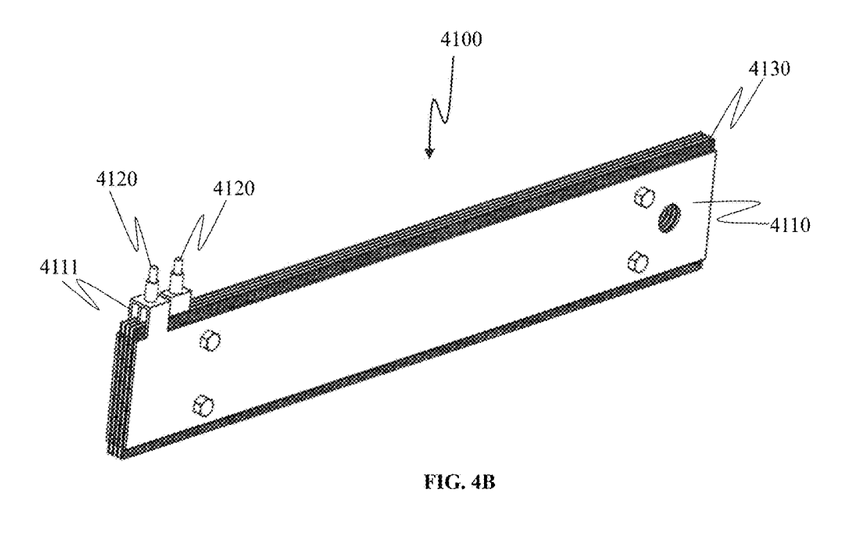
FIG. 4B is a 3D view illustrating the structure of the electrode plate assembly of the electrolysis module according to an embodiment of the invention.

Reference is now made to FIG. 4B, which is a 3D view illustrating the structure of the electrode plate assembly 4100. Accordingly, the electrode plate assembly 4100 includes a large number of electrode plates 4110 arranged in two groups as anode (+) and cathode (−) electrodes; wherein each electrode plate 4110 in the two groups is arranged in parallel and alternately, and is supplied with power from the central control unit 1200 via two bolts 4120. According to an embodiment of the invention, the two bolts 4120 are also used to fix the electrode plate assembly 4100 to the electrolysis chamber body 4200 at the location of the power connection box 4210. The electrode fixing ring 4500 is mechanically attached to the electrode plate assembly 4100, helping to secure the electrode plate assembly 4100 from vibrating during operation of the electrolysis module 4000. According to a preferred embodiment of the invention, the electrode plates 4110 are made of titanium or other conductive materials with corrosion resistance in an electrolytic environment. Continuing with FIG. 4B, the electrode plate assembly also includes a large number of polymer membranes 4130 made of polymer; these polymer membranes 4130 are placed between the electrode plates 4110 and are mechanically fixed to the electrode plates 4110. The polymer membranes 4130 help enhance ion exchange.

According to a preferred embodiment of the invention, the DC power supplied to the electrode assembly 4100 is designed for periodic polarity reversal within a predetermined time interval set by the central control unit 1200, which helps clean the electrode surfaces, limit polarization phenomena, and extend the operational lifespan of the electrodes. That is, periodically, after a predetermined time interval, the central control unit 1200 automatically reverses the current direction in the electrode plates 4110, via the two bolts 4120, converting anode (+) to cathode (−) and vice versa. According to a preferred embodiment of the invention, the periodic interval for reversing anode (+) to cathode (−) and vice versa is every 30 minutes.

The electrolysis module 4000 operates as an enhanced treatment stage after the acceleration module 2000 when the system 1000 determines the influent is highly polluted wastewater and the $Fe^{3+}/H_2O_2$ chemical module is activated. Thanks to the combination of electrolysis and the Fenton reaction, the system 1000 of the invention achieves the following objectives: (a) effective removal of persistent organic pollutants (pesticides, dyes, surfactants, etc.); (b) strong disinfection, deodorization, and decolorization; (c) Increased processing speed and efficiency of subsequent biological degradation (if any); (d) reduced need for auxiliary filtration systems or complex biological treatments.

The operating principle of the electrolysis module 4000 commences with wastewater, already pre-treated by cavitation and magnetic fields in the acceleration module 2000, flowing into the electrolysis chamber body 4200. It is noted that if the chemical dosing module 3000 was activated, it would have previously added $Fe^{3+}/H_2O_2$ to the water, initiating the Fenton reaction and generating strong oxidizing hydroxyl radicals (OH·) to decompose organic matter.

Within the electrolysis chamber, specific reactions occur at the electrodes. Initially, at the anode, oxidation takes place, which further destroys organic matter and produces $O_2$ gas, as described by the equation $2H_2O \rightarrow O_2 + 4H^+ + 4e^-$. If $Cl^-$ ions are present in the water, a reaction forming HClO, a disinfectant, also occurs: $2Cl^- \rightarrow Cl_2 + 2e^-$ and $Cl_2 + H_2O \rightarrow HClO + HCl$. Concurrently, at the cathode, reduction reactions regenerate $Fe^{2+}$ from $Fe^{3+}$, which is crucial for sustaining the Fenton reaction ($Fe^{3+} + e^- \rightarrow Fe^{2+}$ and $Fe^{2+} + H_2O_2 \rightarrow Fe^{3+} + OH^- + OH·$). Simultaneously, the cathode also produces $H_2$ gas and $OH^-$ ions according to the reaction $2H_2O + 2e^- \rightarrow H_2 + 2OH^-$. A key aspect of the module's operation is the polarity reversal that occurs every 30 minutes. During this process, the central control unit 1200 automatically reverses the current direction through the electrode plates 4110, effectively switching the anode to become the cathode and vice versa. Upon such reversal, the electrode that was previously the anode, potentially with scale buildup such as $Fe(OH)_3$ or $CaCO_3$, becomes the cathode. Here, reduction reactions dissolve the scale, for instance: $CaCO_3 + 2H^+ \rightarrow Ca^{2+} + H_2O + CO_2$. Conversely, the electrode that was previously the cathode becomes the anode, where any metallic or organic scale is oxidized, thereby cleaning its surface.

Furthermore, the polymer membrane 4130 plays a role by allowing ion exchange, specifically permitting cations like $H^+$ to move through while retaining anions like $OH^-$. This ensures continued electrolysis efficiency and helps maintain the Fenton reaction even during the polarity reversal cycles.

Achieved efficiency: Wastewater is thoroughly treated by OH· radicals from the Fenton reaction, significantly reducing COD and destroying persistent organic pollutants. HClO (if $Cl^-$ is present) disinfects the water, and heavy metals (such as Fe, Mn) are removed by precipitation at the cathode. Performing polarity reversal every 30 minutes by the central control unit 1200 cleans scale from the electrodes, maintains efficiency, extends the lifespan of the electrode plate assembly 4100, and ensures water meets discharge standards.

Figure 5:
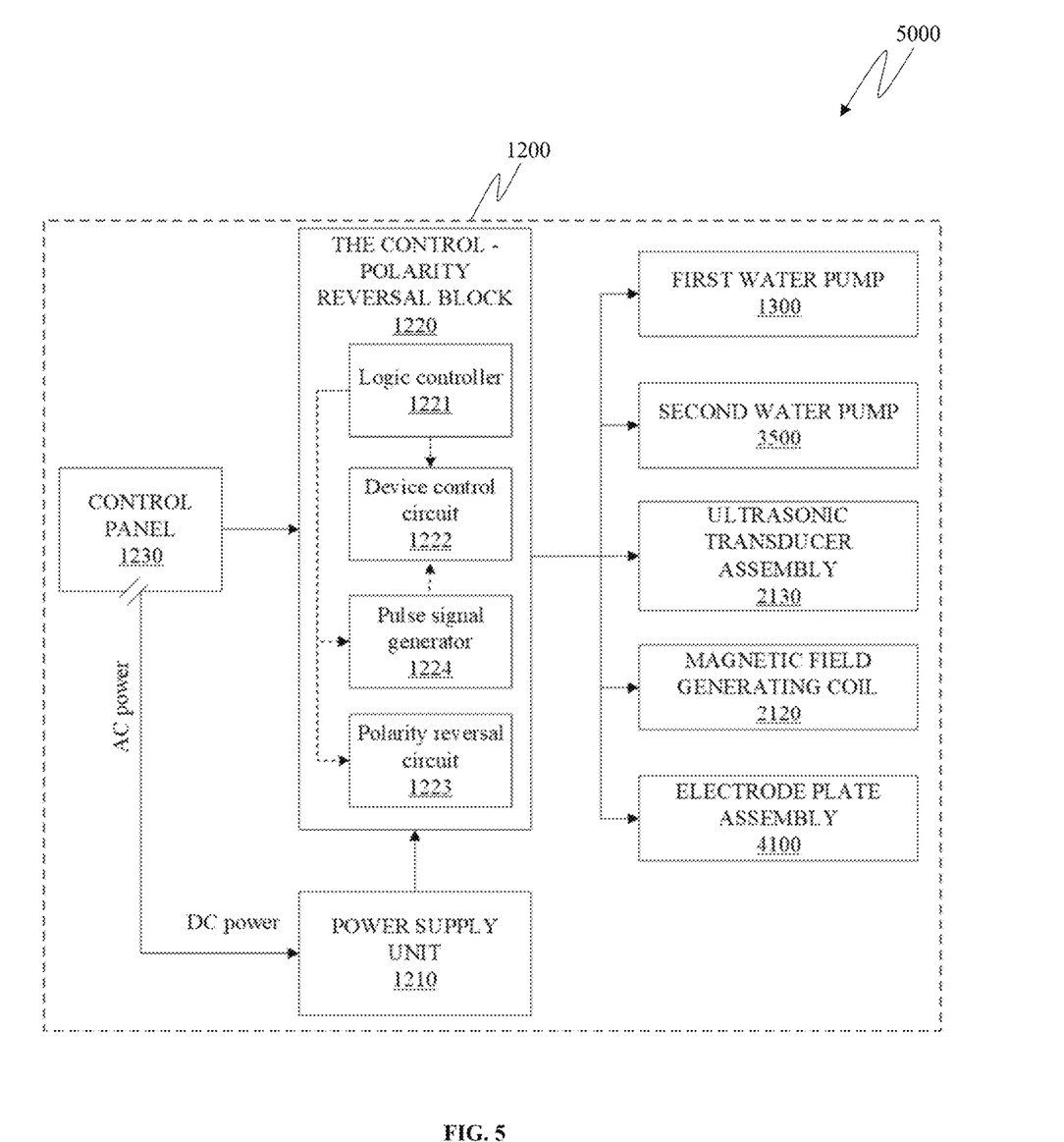
FIG. 5 is a block diagram illustrating the central control unit of the versatile physicochemical water treatment system according to an embodiment of the invention.

Reference is now made to FIG. 5, which is a block diagram illustrating the central control unit 1200 according to an embodiment of the invention. The central control unit 1200 is the main coordinating component of the versatile physicochemical water treatment system 1000, responsible for supplying power and controlling the operating devices within the system 1000, including: the first water pump 1300, the second water pump 3500, the ultrasonic transducers 2131, the magnetic field generating coil 2120, and the electrode plate assembly 4100. The central control unit 1200 has a structure as shown in the block diagram of FIG. 5, comprising the following main components: a power supply unit 1210, a control-reversal block 1220, and a control panel 1230.

According to an embodiment of the invention, the power supply unit 1210 includes two types of sources: 220V AC power from the mains or DC power from a battery, solar power system, or industrial power supply. This power is supplied to the power supply unit 1210, where the current is converted and regulated to appropriate voltage and current levels to supply the devices in the system 1000. If AC power is used, the power supply unit will include a rectifier and voltage filter; if DC power is used, the power supply unit may integrate a DC-DC voltage regulator circuit. This power supply unit provides stable DC current to the control-reversal block 1220 and output loads.

Continuing with FIG. 5, the control panel 1230 is located on the exterior of the electrical cabinet and includes push buttons, switches, and status indicator lights, allowing the operator to start or stop the system in semi-automatic mode; select manual or automatic mode for each device (if needed), and monitor operational status (power indicator, pump running indicator, error indicator, etc.). Signals from the control panel 1230 are sent to the control-reversal block 1220 to coordinate the operation of the system 1000 according to programmed logic.

According to an embodiment of the invention, the control-reversal block 1220 is the control center of the system

1000, comprising: a logic control circuit 1221, a device control circuit 1222, a polarity reversal circuit 1223, and a pulse signal generator 1224.

The logic control circuit 1221 includes a microcontroller, mini PLC, or programmable relay set. This unit processes signals from the control panel 1230, receives signals from the pulse signal generator 1224, executes programmed control algorithms, manages operating times, on/off cycles for each device, and the timing for polarity reversal for the electrolysis module 4000. It also sends control commands to the device control circuit 1222.

The pulse signal generator 1224 generates basic electrical pulse waveforms (e.g., square waves, triangular waves) with frequency and characteristics adjustable according to requests from the logic control circuit 1221. These pulse signals are supplied to the logic control circuit 1221 to serve as a basis for creating complex control sequences, especially for the magnetic field generating coil 2120.

The device control circuit 1222 receives commands from the logic control circuit 1221 to directly control the output devices. The device control circuit 1222 includes a plurality of relays or contactors (not shown in the figure) to switch power for the first water pump 1300, the second water pump 3500, and the ultrasonic transducer assembly 2130. Furthermore, the device control circuit 1222 includes at least one specialized Pulse Width Modulation (PWM) circuit (not shown in the figure) for controlling the magnetic field generating coil 2120. These PWM circuits receive control signals (shaped based on signals from the pulse signal generator 1224) from the logic control circuit 1221 and adjust the pulse width (duty cycle) of the electrical pulses supplied to the magnetic field generating coil 2120. This allows precise control of the intensity and waveform of the generated multipole magnetic field, such as square wave or triangular wave magnetic fields. According to a preferred embodiment of the invention, this PWM circuit uses power semiconductor components (such as MOSFETs or IGBTs) to amplify control signals from the logic control circuit 1221.

Continuing with FIG. 5, the polarity reversal circuit 1223, using two high-power contactors or relays connected in an H-Bridge configuration, allows swapping of the positive and negative poles supplying the electrode plate assembly 4100 of the electrolysis module 4000. The logic control circuit 1221 will automatically activate the polarity reversal circuit 1223 periodically, according to a predetermined time interval (e.g., every 30 minutes), to prevent fixed polarization on the surfaces of the electrode plates 4110, limit scaling, and extend the lifespan of the electrode plates 4110.

The control-reversal block 1220 supplies power and coordinates control signals to the output devices.

Specifically, for the chemical dosing module 3000, it controls the second water pump 3500 to manage the supply of $Fe^{3+}/H_2O_2$ or $O_3/H_2O_2$ chemicals in wastewater or agricultural/aquaculture water treatment modes. It also controls the first water pump 1300 to regulate the water flow into the physicochemical reaction chamber 2110 of the acceleration chamber module 2000.

Furthermore, the control-reversal block 1220 manages the ultrasonic transducer assembly 2130 by controlling its on/off state to generate acoustic cavitation. For the magnetic field generating coil 2120, this coil receives pulse width modulated (PWM) signals from the PWM circuits within the device control circuit 1222—which are, in turn, controlled by the logic control circuit 1221 based on signals from the pulse signal generator 1224—to generate a multipole magnetic field with desired waveforms (square, triangular) and intensity, thereby supporting water treatment.

Lastly, the electrode plate assembly 4100 receives DC power with periodically reversed polarity from the polarity reversal circuit 1223, according to a predetermined interval, to perform electrolysis and electrochemical Fenton reactions.

The arrangement of the pulse signal generator 1224 within the control-reversal block 1220 and the PWM circuits within the device control circuit 1222 allows for a clear control structure: the pulse signal generator 1224 provides basic waveforms, the logic control circuit 1221 processes and coordinates, and then the device control circuit 1222 with its PWM circuits executes precise power control to the coil, creating diverse and effective magnetic fields.

The system 1000 of the present invention achieves several significant results.

It offers flexible operation, capable of using either mains power or DC sources, which makes it suitable for areas with limited infrastructure.

The system features integrated control and polarity reversal within a single block, a design that optimizes layout and facilitates installation.

Furthermore, it supports semi-automatic operation, where the operator only needs to start the system, and the entire treatment cycle is then automatically coordinated.

A key outcome is the optimized lifespan of equipment, especially for the electrode plate assembly 4100, due to the periodic polarity reversal mechanism.

The system also allows for precise and flexible control of the magnetic field generating coil through the combination of the pulse signal generator 1224, logic control circuit 1221, and PWM circuits; this enhances its adaptability and treatment efficiency for different water types.

Finally, its design is easy to construct and maintain, rendering it suitable for a variety of industrial, domestic, or agricultural environments.

According to an embodiment of the invention, microcontrollers/mini PLCs, programmable relays, relays, contactors, rectifiers and voltage filters, DC-DC voltage regulator circuits, pulse signal generators, and PWM circuit components are commonly used electronic/control devices, and therefore will not be described in further detail here to avoid obscuring other important aspects of the present invention. Furthermore, establishing a central control unit 1200 as described above is sufficiently clear for a person of average skill in the same field to implement without detailed instructions. It should also be noted that the term "signal" used in the central control unit 1200 refers to electrical signals, including digital ON/OFF signals, pulse signals, or voltage/current signals controlling load devices.

Figure 6:
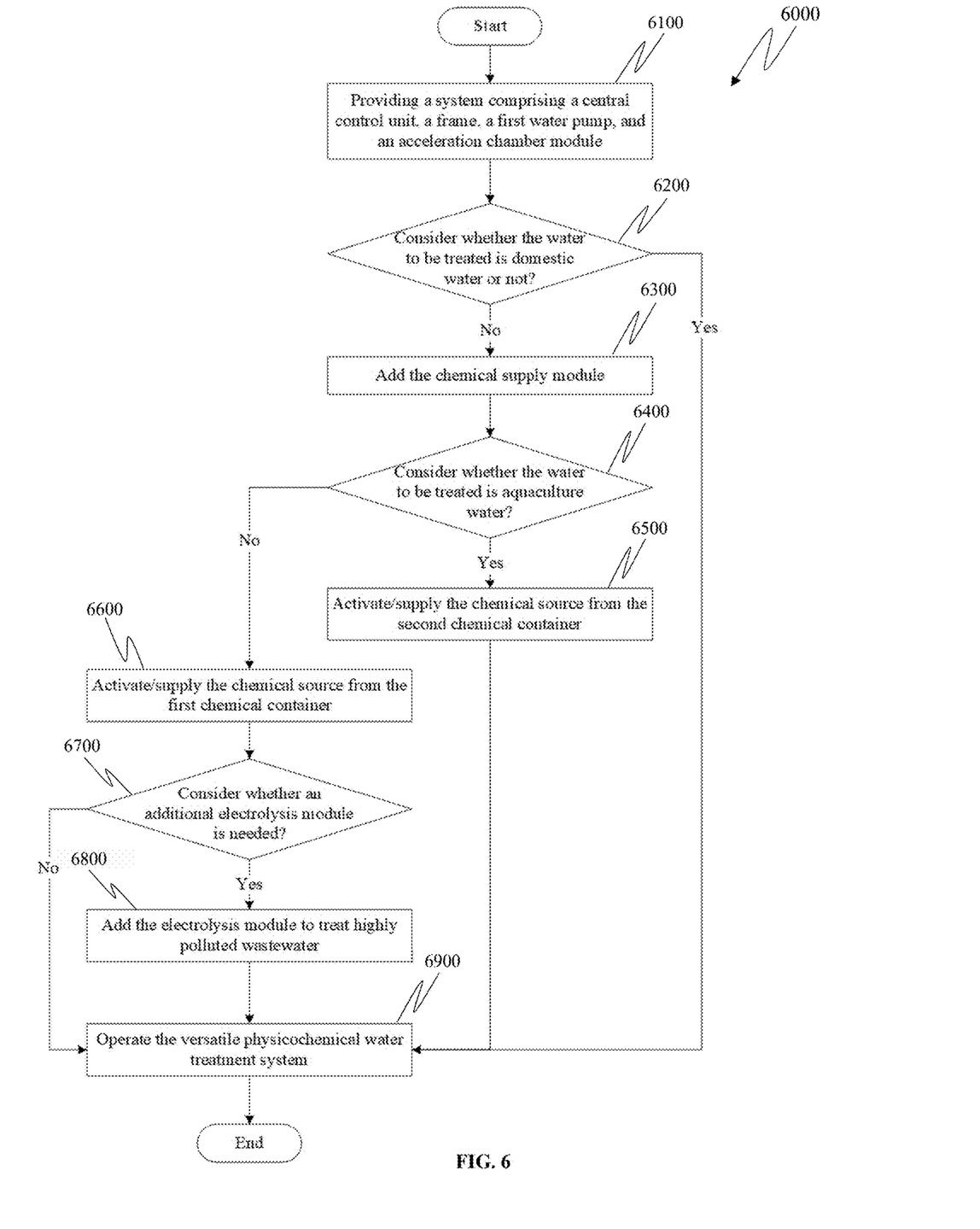
FIG. 6 is a flowchart illustrating the versatile physicochemical water treatment method according to an embodiment of the invention.

Reference is now made to FIG. 6, which is a flowchart illustrating the versatile physicochemical water treatment method according to an embodiment of the invention. Accordingly, the versatile physicochemical water treatment method ("method 6000") begins with step 6100, which is to provide a system 1000 comprising a central control unit 1200, a machine frame 1100, a first water pump 1300, and an acceleration chamber module 2000. The structure and function of the central control unit 1200, machine frame 1100, first water pump 1300, and acceleration chamber module 2000 are as described in FIG. 1 and FIG. 2A-FIG. 2D.

In step 6200, it is determined whether the water to be treated is for domestic use: if it is for domestic use, proceed to step 6900; otherwise, if it is wastewater or aquaculture water, proceed to step 6300.

In step 6300, the chemical dosing module 3000 is added. The structure and operating principle of the chemical dosing module 3000 have been described in detail in FIG. 3A-FIG. 3C.

In step 6400, it is determined whether the water to be treated is aquaculture water or wastewater: if it is aquaculture water, proceed to step 6500; otherwise, proceed to step 6600.

In step 6500, the chemical source in the second chemical tank 3120 is activated/supplied to treat aquaculture water.

In step 6600, the chemical source in the first chemical tank 3110 is activated/supplied to treat wastewater.

In step 6700, depending on the pollution level of the wastewater, it is determined whether this wastewater treatment requires the addition of the electrolysis module 4000: if yes, proceed to step 6800; otherwise, proceed to step 6900.

In step 6800, the electrolysis module 4000 is added to treat highly polluted wastewater. The structure and operating principle of the electrolysis module 4000 have been described in detail in FIG. 4.

In step 6900, the system 1000 is operated, which includes setting up the operating mechanism of the system 1000 at the central control unit 1200, starting the first water pump 1300 to pump water into the acceleration chamber module 2000, and activating options for the chemical dosing module 3000 and/or the electrolysis module 4000.

In the acceleration chamber module 2000, water is treated through hydrodynamic cavitation generated by the static mixer 2150, and acoustic cavitation from ultrasonic waves generated by the ultrasonic transducer assembly 2130. Additionally, a static magnetic field is applied from the permanent magnet assembly 2140. Simultaneously, via the central control unit 1200, the magnetic field generating coil 2120 is controlled to create a variable multipole magnetic field. Depending on the characteristics of the influent water and/or specific treatment requirements, the central control unit 1200 will adjust the magnetic field generating coil 2120 to emit magnetic fields in the form of square or triangular waves, or a combination/sequence of both, with appropriate frequency and intensity. For example, a square wave magnetic field may be selected to enhance the breaking of ion bonds in high-hardness water or to treat persistent organic pollutants, while a triangular wave magnetic field may be selected to maintain the stability of treated ions or for applications requiring a gentler magnetic field effect.

Additionally, in step 6900, after determining the type of water to be treated from the steps above (e.g., domestic water, wastewater, agricultural water), the central control unit 1200 not only activates the appropriate modules (chemical dosing module 3000, electrolysis module 4000) but also automatically or allows the operator to select the optimal operating mode for the magnetic field generating coil 2120, including the application of square or triangular wave magnetic fields, to achieve the highest treatment efficiency for that water type.

Step 6900, at the central control unit 1200, also includes setting the periodic polarity reversal time for the electrolysis module 4000 if this option is selected; the central control unit 1200 periodically reverses the polarity of the electrode plates 4110 to prevent fixed polarization on the electrode surfaces, limit scaling, and extend the lifespan of the electrode plates 4110.

As discussed from FIG. 1 to FIG. 6, the system 1000 and method 6000 of the present invention achieve several key objectives.

A primary objective is high modularity, which encompasses the acceleration chamber module 2000, chemical dosing module 3000, and electrolysis module 4000. This design allows each module to operate independently or in coordination, depending on the specific water type and pollution level being addressed.

Another significant objective achieved is the synchronous integration of multiple water treatment principles. These principles include hydrodynamic cavitation, acoustic cavitation, static magnetic fields, multipole magnetic fields that emit square and/or triangular waves, effective chemical mixing, and electrolysis complete with an automatic polarity reversal mechanism.

Furthermore, the invention provides flexible water treatment capability. It is applicable to a range of water types, including ordinary domestic water, agricultural water, wastewater discharge, and aquaculture water, all treatable through various physicochemical module configurations.

Finally, the system offers centralized control capability, managed by the central control unit 1200. This central control unit possesses an integrated structure designed to optimize the treatment process, as well as to monitor and adjust operations according to treatment cycles suitable for each specific water type.

The foregoing discussions/statements have fully described at least one embodiment of the invention; other equivalent or alternative embodiments for implementing a versatile physicochemical water treatment system according to the invention will be apparent to those of average skill in the relevant art. Various aspects of the invention have been described above by way of illustration, and the specific embodiments disclosed are not intended to limit the invention to the particular forms disclosed. Accordingly, the invention includes all modifications, equivalents, and alternatives, such as an automatically controlled versatile physicochemical water treatment system and/or integration of sensors, etc., that fall within the spirit and scope of the following claims. It is to be further understood that not all embodiments disclosed in the above description will necessarily satisfy or achieve every objective.

REFERENCE NUMERALS

1000 Versatile physicochemical water treatment system
1100 Machine frame
1120 Wheels
1200 Central control unit
1210 Power supply unit
1220 Control-Reversal Block
1221 Logic control circuit
1222 Device control circuit
1223 Polarity reversal circuit
1224 Pulse signal generator
1300 First water pump
2000 Acceleration chamber module
2100 Acceleration assembly
2110 Physicochemical reaction chamber
2111 Middle body section
2112 Inlet section
2113 Outlet section
2120 Magnetic field generating coil
2121 Clamp/Retaining ring
2130 Ultrasonic transducer assembly
2131 Ultrasonic transducer
2140 Permanent magnet assembly
2141 Permanent magnet
2142 Enclosure frame
2150 Static mixer
2151 Static vane 2152 Shaft
2200 Outer casing
2210 Front end cap
2211 Water inlet
2220 Rear end cap
2221 Water outlet
3000 Chemical dosing module
3100 Chemical storage unit
3110 First chemical tank
3120 Second chemical tank
3200 Gas-liquid mixing unit
3210 First injector
3211 Liquid connection port
3212 Gas connection port
3220 Second injector
3221 Liquid connection port
3222 Gas connection port
3300 Chemical dosing pipe
3400 Plastic water pipe
3500 Second water pump
4000 Electrolysis module
4100 Electrode plate assembly
4110 Electrode plate
4120 Bolt
4130 Polymer membrane
4200 Electrolysis chamber body
4300 First end cap (Electrolysis)
4400 Second end cap (Electrolysis)
4500 Electrode fixing ring

What is claimed is:

1. A versatile physicochemical water treatment system, comprising:
an acceleration chamber module having a physicochemical reaction chamber with an inlet and an outlet for water flow, said physicochemical reaction chamber containing therein a helically formed static mixer;
disposed externally thereto at least one ultrasonic transducer assembly configured to emit ultrasonic waves in the 25-40 KHz frequency range to generate acoustic cavitation;
at least one permanent magnet assembly to generate a static magnetic field;
at least one magnetic field generating coil; and
a central control unit electrically connected to at least said ultrasonic transducer assembly and said magnetic field generating coil;
wherein said central control unit is configured to control said magnetic field generating coil to generate a variable multipole magnetic field, including the capability to generate magnetic fields in the form of square waves and/or triangular waves acting on the water flow; and
wherein said acceleration chamber module is configured to treat water through the combined effects of hydrodynamic cavitation from said static mixer, acoustic cavitation from said ultrasonic transducer assembly, a static magnetic field from said permanent magnet assembly, and a variable multipole magnetic field in square wave and/or triangular wave form from said magnetic field generating coil.

2. The system according to claim 1, wherein said static mixer is helically formed from a flat rectangular metal plate having a length ($L_2$) and a width ($W_2$), said flat plate having a central shaft portion occupying about 15-25% of said width ($W_2$) and two rows of rectangular static vanes machined along both sides of said shaft portion, each vane having a length ($L_3$) equal to about 35-45% of said width ($W_2$).

3. The system according to claim 2, wherein said static mixer has a length ($L_2$) in the range of 0.9 to 0.95 times the length ($L_1$) of a middle body section of said physicochemical reaction chamber, and an initial width ($W_2$) of said flat plate in the range of $\pi$ multiplied by (0.8 times the minimum value between a width ($W_1$) and a height ($H_1$) of said middle body section) to $\pi$ multiplied by (0.9 times the minimum value between said width ($W_1$) and said height ($H_1$) of said middle body section).

4. The system according to claim 1, wherein said permanent magnet assembly comprises a plurality of permanent magnets arranged with alternating poles (N-S-N-S) and enclosed by an enclosure frame.

5. The system according to claim 1, wherein said magnetic field generating coil is disposed around a portion of said physicochemical reaction chamber, preferably at an inlet section thereof.

6. The system according to claim 1, wherein said central control unit comprises a control-reversal block containing a pulse signal generator and a device control circuit integrating pulse width modulation (PWM) circuits, to control said magnetic field generating coil to generate magnetic fields in the form of square waves and/or triangular waves with adjustable frequency and intensity.

7. The system according to claim 1, further comprising a chemical dosing module having an outlet connected to the inlet of said acceleration chamber module;
wherein said chemical dosing module comprises at least one chemical storage unit and at least one gas-liquid mixing unit using a Venturi-type injector to introduce chemicals from said chemical storage unit into the water flow.

8. The system according to claim 7, wherein said chemical storage unit comprises a first chemical tank containing $Fe^{3+}$ and $H_2O_2$ and/or a second chemical tank containing $O_3$ and $H_2O_2$.

9. The system according to claim 7, wherein said acceleration chamber module and said chemical dosing module are modularly configured to operate independently or in combination with each other, and optionally with an electrolysis module, based on the type of water to be treated.

10. The system according to claim 7, further comprising an electrolysis module having an inlet connected to the outlet of said acceleration chamber module, wherein said electrolysis module comprises an electrode plate assembly to perform electrolysis on water flowing therethrough, and wherein said central control unit is further configured to control said electrolysis module including periodic polarity reversal of said electrode plate assembly.

11. The system according to claim 10, wherein said acceleration chamber module, said chemical dosing module, and said electrolysis module are modularly configured to operate independently or in combination with one another based on the type of water to be treated.

12. The system according to claim 1, further comprising an electrolysis module having an inlet connected to the outlet of said acceleration chamber module;
wherein said electrolysis module comprises an electrode plate assembly to perform electrolysis on water flowing therethrough.

13. The system according to claim 12, wherein said central control unit comprises a control-reversal block containing a polarity reversal circuit, configured to supply direct current (DC) power to said electrode plate assembly and automatically reverse the polarity of said DC power according to a predetermined time cycle, preferably about 30 minutes.

14. The system according to claim 12, wherein said acceleration chamber module and said electrolysis module are modularly configured to operate independently or in combination with each other, and optionally with a chemical dosing module, based on the type of water to be treated.

15. The system according to claim 1, wherein said acceleration chamber module is modularly configured to be capable of operating independently or in combination with at least one further processing module based on the type of water to be treated.

* * * * *